(12) United States Patent
Singh et al.

(10) Patent No.: US 10,367,708 B2
(45) Date of Patent: Jul. 30, 2019

(54) NETWORK CODING AWARE NODES IN A DISTRIBUTED NETWORK

(71) Applicant: Dell Products LP, Round Rock, TX (US)

(72) Inventors: Ankit Singh, Bangalore (IN); Rohitkumar Arehalli, Bangalore (IN); Shrikant Hallur, Bangalore (IN)

(73) Assignee: Dell Products LP, Round Rock, TX (US)

( * ) Notice: Subject to any disclaimer, the term of this patent is extended or adjusted under 35 U.S.C. 154(b) by 140 days.

(21) Appl. No.: 15/669,602

(22) Filed: Aug. 4, 2017

(65) Prior Publication Data

US 2019/0044837 A1   Feb. 7, 2019

(51) Int. Cl.
*H04L 12/26* (2006.01)
*H04L 1/00* (2006.01)
*H04L 29/08* (2006.01)
*H04L 29/06* (2006.01)

(52) U.S. Cl.
CPC ........ *H04L 43/0811* (2013.01); *H04L 1/0076* (2013.01); *H04L 43/0829* (2013.01); *H04L 67/10* (2013.01); *H04L 67/12* (2013.01); *H04L 67/42* (2013.01)

(58) Field of Classification Search
CPC ..... H04L 43/0829; H04L 67/10; H04L 67/12; H04L 67/1097; H04L 1/0002; H04L 5/0064; H04L 1/0076; H04L 69/22; H04L 1/0057; H04L 45/16; H04L 1/0075; H04L 29/08; H04L 47/12; H04L 47/25; H04L 1/0009; H04L 1/0056; H04L 1/0077; H04L 43/0811; H04L 84/18; H04L 76/02
See application file for complete search history.

(56) References Cited

U.S. PATENT DOCUMENTS

| | | | | |
|---|---|---|---|---|
| 2011/0164621 A1* | 7/2011 | Lee | ..................... | H04B 7/15521 370/400 |
| 2011/0176408 A1* | 7/2011 | Sun | ..................... | H04B 7/15521 370/216 |
| 2012/0188934 A1* | 7/2012 | Liu | ..................... | H04L 12/1863 370/312 |
| 2013/0051377 A1* | 2/2013 | Seferoglu | ......... | H04W 28/0236 370/338 |

* cited by examiner

*Primary Examiner* — Awet Haile
(74) *Attorney, Agent, or Firm* — Staniford Tomita LLP

(57) ABSTRACT

Embodiments are directed to transmitting network coding (NC) traffic in heterogeneous networks having both NC and non-NC nodes. A non-NC node, upon receiving the first NC encoded packet will return an error in acknowledgement to the source NC node. The source NC node maintains a table of directly neighbor nodes that indicates whether or not NC is supported. The source NC node decodes the packet for any non-NC destination node and sends the encoded packet to NC nodes per the table. For a non-NC node in the network, the source NC node will send an encoded packet and based on an acknowledgement, the table entry for that node is updated. If NC is supported, the source sends the encoded packet, otherwise it sends the decoded packet.

20 Claims, 7 Drawing Sheets

NETWORK CODING AWARE NODES IN A DISTRIBUTED NETWORK

TECHNICAL FIELD

Embodiments are generally directed to large-scale computer networks, and specifically to enabling full network coding for partially coding-enabled networks.

BACKGROUND

In traditional routing networks, data packets are cached and forwarded downstream. If a routing node receives two packets from two or more sources, it forwards them one after another in a queue. This requires separate transmissions for every message delivered, which decreases network efficiency. Network coding was developed to overcome this efficiency problem by merging messages through an encoding algorithm and forwarding the accumulated result to the destination, where it is decoded using the same algorithm. Network coding thus improves transmission efficiency by combining (encoding) several packets together and sending only the resultant encoded packet.

The extent of throughput improvement and transmission efficiency in network coding systems depends highly on the network topology and the frequency and severity of bottlenecks. Network coding is generally more useful in wireless mesh networks, messaging networks, storage networks, multicast streaming networks, file-sharing peer-to-peer networks and other networks, where the same data needs to be transmitted to a number of destination nodes. Regular peer-to-peer networks do not generally benefit as much from network coding as it complicates network synchronization, and the nodes may need a large amount of processing time while trying to decode data, which may outweigh the bottleneck issue. Thus, large networks can increase their efficiency through the use of network coding, but high overhead costs may make it less viable for small networks.

Besides topography limitations, network coding poses several other significant challenges. These include the need to maintain synchronicity among the nodes, and another is that the loss of one packet in the network can cause several losses at the receiver, and any loss in data can cause big delays since data cannot be recovered until all the information necessary is received by the nodes. Perhaps the biggest disadvantage with network coding is in applying it to heterogeneous networks having both network coding (NC) nodes and non-NC nodes. Any NC packets sent to non-NC nodes will be dropped by these nodes since they are not recognized as valid network traffic and cannot be decoded. Thus, use of NC protocols in non-fully NC networks will result in packet loss since the non-NC nodes will drop packets. What is needed therefore, is a network coding system that eliminates packet loss in networks having both NC and non-NC nodes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
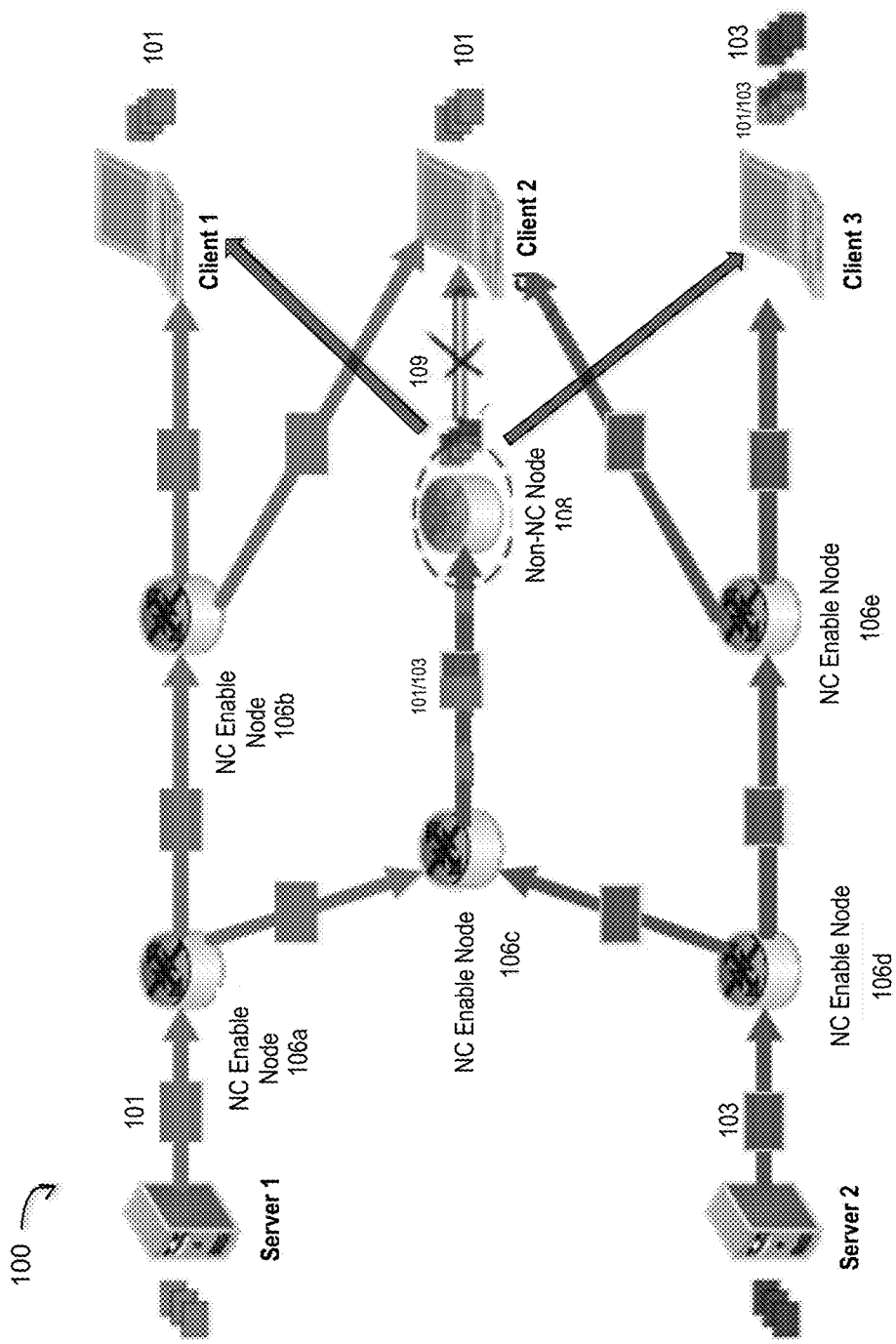
FIG. 1 illustrates a heterogeneous network coding system that implements some embodiments of a network coding (NC) aware method to enable full network coding capability.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve network coding implementation in a very large-scale wide area network (WAN), metropolitan area network (MAN), wireless mesh network, or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

As stated above, network coding is a method that can improve the network throughput by reducing the amount of workload in the network while still ensuring that all user data is transferred. With network coding, a node can improve its transmission efficiency by combining (encoding) several packets together and sending only the resultant encoded packet if the coding conditions are satisfied. In network coding, routers and switches are replaced by coders, which transmit metadata in the form of digital evidence about the message along multiple paths simultaneously. The metadata arriving from two or more sources may be combined into a single packet to increases the effective capacity of a network by minimizing the number and severity of bottlenecks. However, if any of the intermediate nodes are non-NC nodes or are non-NC capable, then all network encoded packets received by them will be dropped, as they will not be able to understand and decode the NC encoded packets.

FIG. 1 illustrates a heterogeneous network coding system that implements some embodiments of a network coding aware method to enable full network coding capability. Network 100 comprises a number of nodes, some of which are network coding (NC) enabled, and at least one of which is non-NC enabled. These packets are encoded (NC encoded) at certain intermediate nodes between the server and client computers. For the example of FIG. 1, server computers (denoted Server 1 and Server 2) send packets to client machines (denoted Client 1, Client 2, and Client 3). Server 1 sends packets 101 through intermediate nodes 106a and 106b to Client 1 and through intermediate nodes 106c and 108 to Client 2. Similarly, Server 2 sends packets 103 through intermediate nodes 106d and 106e to Client 3 and through intermediate nodes 106c and 108 to Client 2. As shown in FIG. 1, intermediate node 108 is a non-NC node 108, and will drop packets destined for Client 2 as this node will not understand any encoded packets, which is shown by crossed out (X) link 109. As a result, Client 2 will only receive data packets 101 from Server 1 and not any of packets 103 or combined packets 101/103 from Server 2 since the packets 103 are not decoded by node 108. It should be noted that FIG. 1 is intended to primarily show connections from Client 2, and therefore, not all possible other network connections are shown to avoid cluttering the diagram.

In an embodiment, the network implements a network coding interoperability (NCI) protocol that comprises certain new coding conditions and a new routing metric that accommodates both NC nodes and non-NC nodes to enable encoded traffic to be transmitted in heterogeneous networks that contain both NC and non-NC nodes network without loss or incurring delays to re-route data around the non-NC nodes. In an embodiment, each node within the network will maintain an NCI table that will keep track of each of its neighboring nodes' coding capability. The NCI node for each node consists of two columns. The first lists the IDs of each directly connected (immediately contiguous) node, and the second column lists the respective NC status of each of these nodes. The NC status is one of three states where YES (or an equivalent state representation) indicates that the node is NC capable, NO (or an equivalent state representation) indicates that the node is not NC capable, and NA (or an equivalent state representation) indicates that the node's status is unknown. Table 1 below illustrates an example NCI Protocol Table, under an example embodiment for a hypothetical central node that has four direct neighboring nodes arranged in a horizontal and vertical orientation in a mesh type layout. Each node is one of three NC capable states: YES or NO or NA. It should be appreciated that the NCI table for a node may have any number of entries depending on the number of neighboring nodes and that the table can accommodate any topography since only direct neighbors for each node are listed. Each node may have only one state, and any inconsistency or discrepancy regarding NC capable status will lead to a node being assigned an NA state.

TABLE 1

| DIRECTLY CONNECTED NODES | NC CAPABLE |
|---|---|
| NODE LEFT | YES/NO/NA |
| NODE RIGHT | YES/NO/NA |
| NODE UP | YES/NO/NA |
| NODE DOWN | YES/NO/NA |

Thus, for the example NCI table for the node of Table 1, if any of its neighboring nodes is NC capable, that node will have "YES" against its entry; if any of its neighboring nodes is non-NC capable, that node will have "NO" against its entry; and if any node has an unknown NC capability, that node will have "NA" against its entry.

In an embodiment, the NCI table for each node is a simple lookup table that is maintained in a database or data structure maintained in each node. It is typically populated dynamically at runtime as each node is evaluated as to its NC capability. The first state of all tables in this embodiment is that all nodes in all tables are originally set to "NA" and as traffic is transmitted through the network, NC node status is communicated among the nodes and neighboring node status in each table is updated to YES or NO or kept at NA, accordingly. Alternatively, the NCI tables in each node can be pre-populated during a system configuration operation during network down time. Statically defined tables may be modified as the network operates and/or as nodes are disabled or enabled with respect to NC capability.

Figure 2:
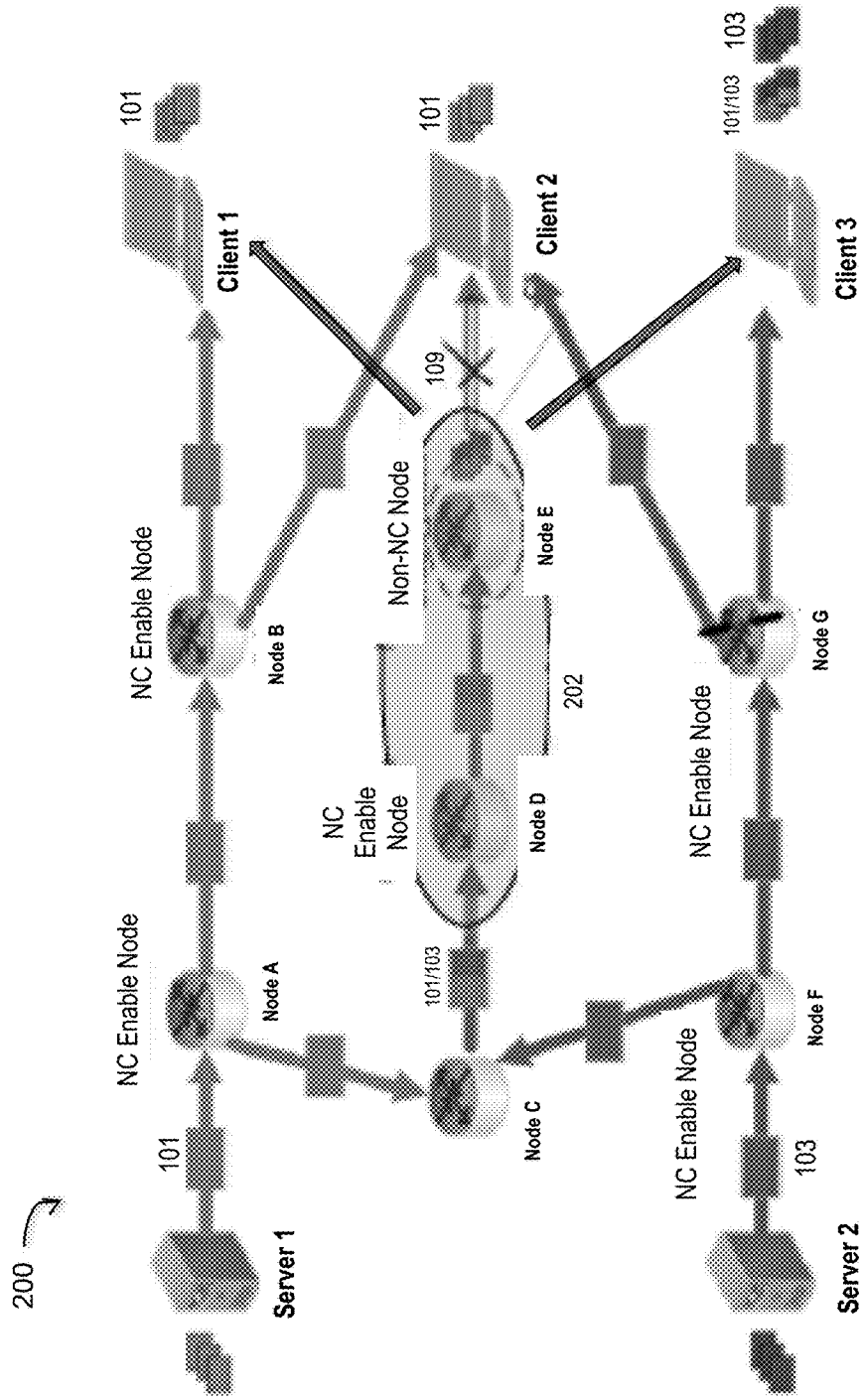
FIG. 2 illustrates the network of FIG. 1 with network coding aware nodes using a network coding interoperability (NCI) protocol, under some embodiments.

FIG. 2 illustrates the network of FIG. 1 with network coding aware nodes using a network interoperability protocol, under some embodiments. As for FIG. 1, in FIG. 2 data packets 101 represent packets originated from Server 1, data packets 103 represent packets originated from Server 2, and data packets labeled 101/103 represent encoded packets after applying the network coding algorithm to both packets 101 and 103. Furthermore, not all possible network connections are shown to avoid overly complicating the diagram. As shown in network 200 of FIG. 2, network 100 is modified by identifying the intermediate nodes Nodes A through G. The non-NC node (Node E) is associated with NC Node D as a protocol grouping 202 that is defined in part by the NCI table for Node D.

Figure 3:
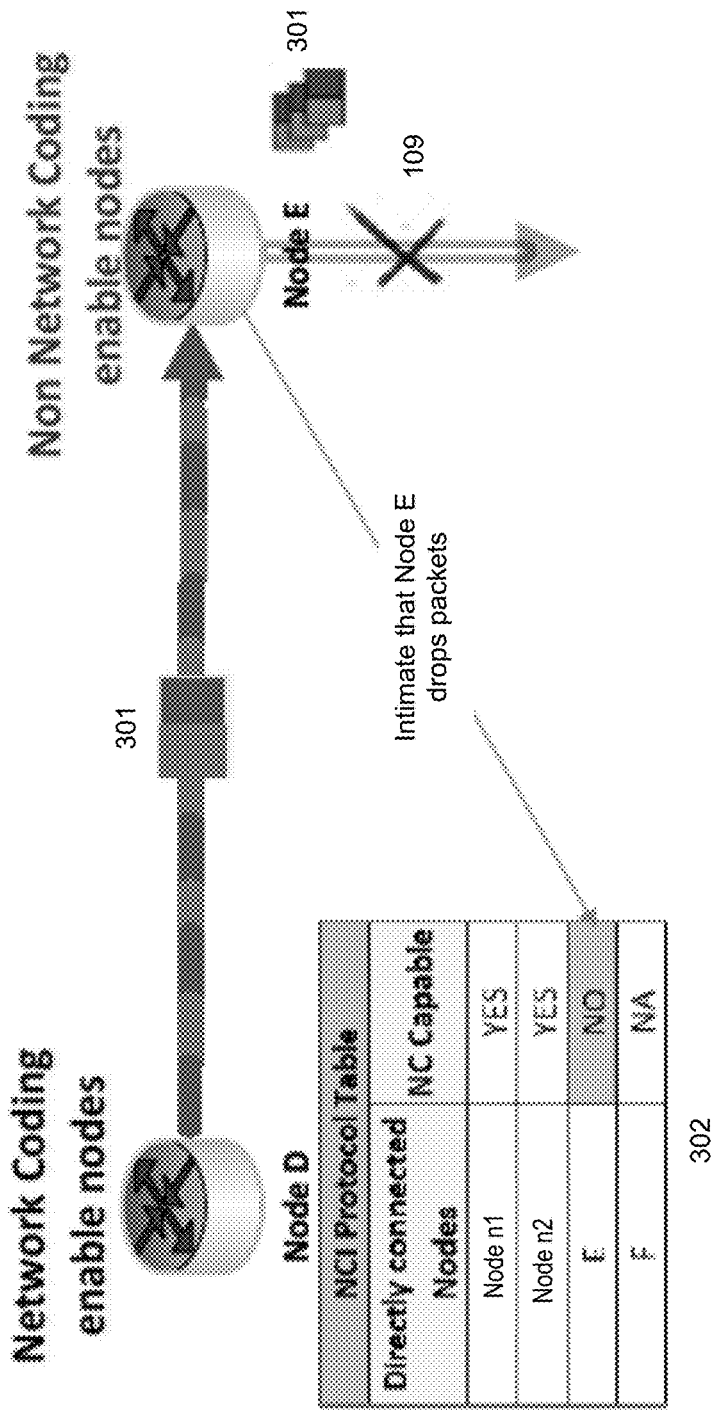
FIG. 3 illustrates the implementation of an example network coding interoperability table, under some embodiments.

FIG. 3 illustrates an operation of the network coding protocol for the network of FIG. 2, under an embodiment. In this case, traffic for the non-NC node E is accommodated through the NCI table of neighboring Node D. As shown in FIG. 3, Node D transmits hybrid packets 101/103 to Client 2 through Node E. Since Node E is non-NC enabled it would normally drop these packets, as shown in broken link 109. Upon the first time that traffic is attempted to pass through Node E, and Node E drops the packets, it intimates Node D to update its NCI protocol table. Thus, as shown in FIG. 3, NCI table 302 for Node D has corresponding entries for the four neighboring nodes (A, C, E, F) of Node D. Nodes A and C are known NC-capable nodes (due to successfully passed NC encoded packets or pre-defined network settings), while Node F is unknown, and Node E is known not-NC capable due to the packet drop. Thus, Table 302 is populated as shown: Node A: YES, Node C: YES, Node E: NO, Node F: NA. The other nodes in the system, (B, G) are not included in NCI table 302 for Node D because they are only indirectly connected to Node D. It should be noted that the NCI table in FIG. 3 is intended to primarily show the transaction between Node D and Node E and that many other node entries may also be included. For example, Node n1 and Node n2 are meant to represent one or more other arbitrary nodes connected to Node D, as this node may be connected to any practical number of other nodes in the network.

As stated above, in an embodiment, the NCI protocol table for Node D will be updated intelligently based on network packet transmission. If, for example, there is no network packet transmission between any two nodes then it NCI protocol table will have "NA" (e.g., Node F) for that particular node as shown in FIG. 3. The NCI can be populated through network definitions or configuration settings, but more typically nodes that pass encoded packets are labeled "YES", nodes that drop packets are labeled "NO" and non-used nodes are labeled "NA". Thus, FIG. 3 illustrates the process of updating the NCI table 302 for Node D during the course of network transmission as the entry for Node E is updated (from NA) to NO upon intimation that Node E drops encoded packets, as indicated by broken link 109.

Figure 4:
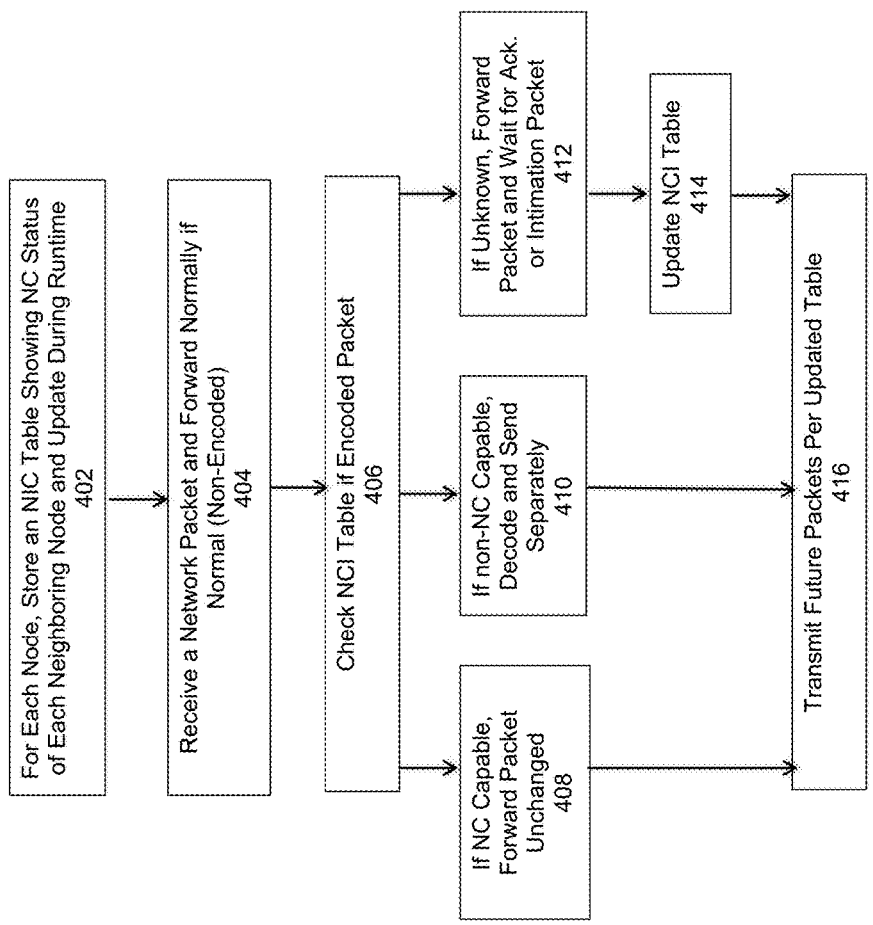
FIG. 4 illustrates a method of implementing an NCI protocol in a heterogeneous network, under some embodiments.

FIG. 4 illustrates a method of implementing a network coding Interoperability (NCI) protocol in a heterogeneous network, under some embodiments. As shown in processing block 402, each node stores an NIC table, such as Table 1, that identifies each directly neighboring node and its corresponding NC status. This table may be populated with default values upon startup, such as all nodes set to NA, and then updated during runtime to reflect NC nodes (YES) and non-NC nodes (NO). As runtime operation commences and continues packet traffic will flow through the nodes. Whenever any node receives a packet, it will perform certain processing depending on the type of packet it receives. If it is a normal packet (non-encoded, non-NC) it will then forward the packet without any manipulation or change, block 404. If it is an NC-encoded packet, the node will check its NCI table for the destination node's NC capability, block 406.

As described above, there are three possible NC states for the destination node: NC capable, non-NC capable, and not known. If the destination node (e.g., Node E in FIG. 3) is NC capable (YES as per the NCI Table), the receiving node (e.g., Node D in FIG. 3) will forward the packet as it is, block 408. If the destination node is non-NC capable (NO as per the NCI Table), the receiving node will decode the packet itself and forward the packets separately, block 410. If the NC capability of the destination node is not known (NA as per the NCI table, e.g., no prior communication), it will forward the packet as it is and will wait to receive an indication of packet receipt or drop from the destination node, block 412. If, in block 412, the packet is dropped at the destination node, that node will send an intimation message to the receiving node about the packet being dropped due to it not having NC capability. If the packet is not dropped and is forwarded on by the receiving node, this indicates that it is NC capable. The receiving node will then update its NCI table based on any indication (e.g., intimation message or acknowledgment) from the destination node to reflect that the receiving node is NC (YES) or non-NC (NO) capable. It will then transmit future packets to the receiving node in accordance with its updated NCI table.

For the method illustrated in FIG. 4, packet forwarding from the receiving node (e.g., Node D) depends entirely on the NCI table. If the status of the destination node (e.g., Node E) or any particular node is NA or YES, then it would send/forward the packet as it is without any change.

Figure 5:
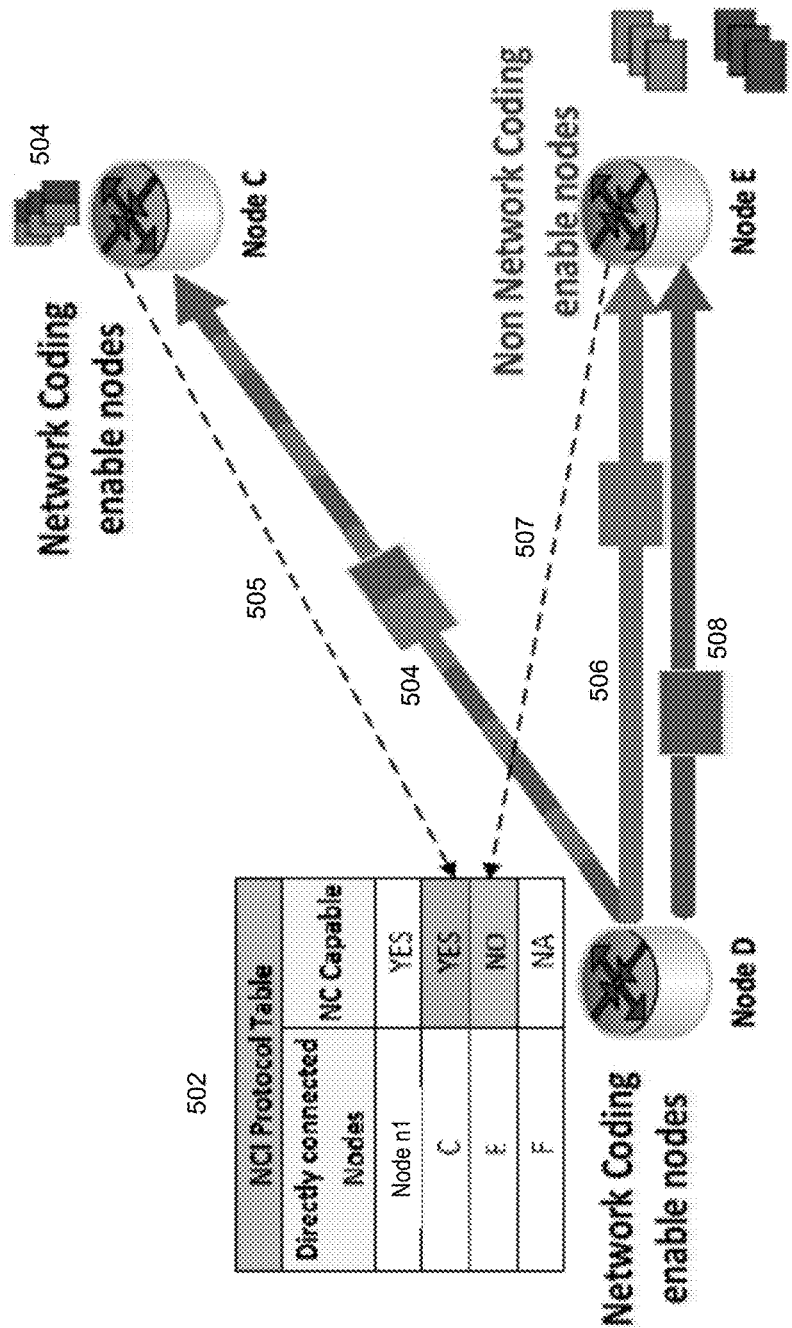
FIG. 5 illustrates transmission of encoded and decoded packets using an NCI protocol, under some embodiments.

In the case that the destination node is non-NC capable (NO), as shown in block 410 of FIG. 4, the receiving node clearly knows that the receiving node E is a non-NC capable and would drop the packet as the receiving node would not understand it anyway. In that case, it would try to decode the packet itself. In an embodiment, this decode operation comprises trying to separate the packets based on the underlying network coding algorithm. Once separated, the receiving node would send/forward the decoded packets separately. FIG. 5 illustrates transmission of encoded and decoded packets in this case, under some embodiments. As shown in FIG. 5, Node D (receiving node) maintains NCI table for downstream (receiving) nodes Node C and Node E. Again, as stated above, the table 502 may include any number of nodes, as represented by the arbitrary node entry Node n1. For the example of FIG. 5, Node C is an NC-enabled node and Node E is a non-NC node. Both NC and non-NC packet traffic 504 is passed from Node D to Node C with no dropped packets, so an indication message 505 from Node C to Node D causes the NCI table 502 entry for Node C to be updated to "YES". NC packet traffic from Node D to Node E would be dropped at Node E, so an intimation message 507 is sent back to Node D to update the NCI table 502 entry for Node E to be updated to "NO". Node D then decodes and separates the NC and non-NC packets into separate packet traffic streams 506 and 508. The next NC packets sent from Node D to Node E are then decoded first at Node D so they can pass through the non-NC Node E without being dropped. In this manner, the heterogeneous network comprising both NC and non-NC nodes can be NC-aware and NC-capable with respect to sending both encoded and non-encoded traffic. By determining the status of downstream nodes and performing decoding directly, if necessary, an NC node can process and condition NC traffic to accommodate a non-NC node after the first instance of a packet drop.

In the case of an unknown (NA) node that is non-NC capable, and would drop the packet, as shown in block 412 of FIG. 4, there are several different messages or indications that can be sent back to the receiving node for it to update its NCI table, block 414. In the case of an ACK (acknowledgment)-based connection, the final destination would not receive the packet (as it was dropped at the node) and therefore the initial source node would not receive the ACK and after the timeout it would re-transmit the packet. This timeout indication would cause the receiving node to update its NCI table, and this re-transmission packet would now automatically be taken care of by the receiving node as the NCI table is already updated based on the previous packet drop. Alternatively, instead of dropping the NC packet at the destination node, it can send it back to the receiving node for decoding along with the intimation packet to update the NCI Table. The unknown (NA) condition of box 412 should be encountered only for the first time that a packet is transmitted from the receiving node to the destination node, and future packets can be handled per the receiving node's updated NCI table as shown in block 416.

Figure 6:
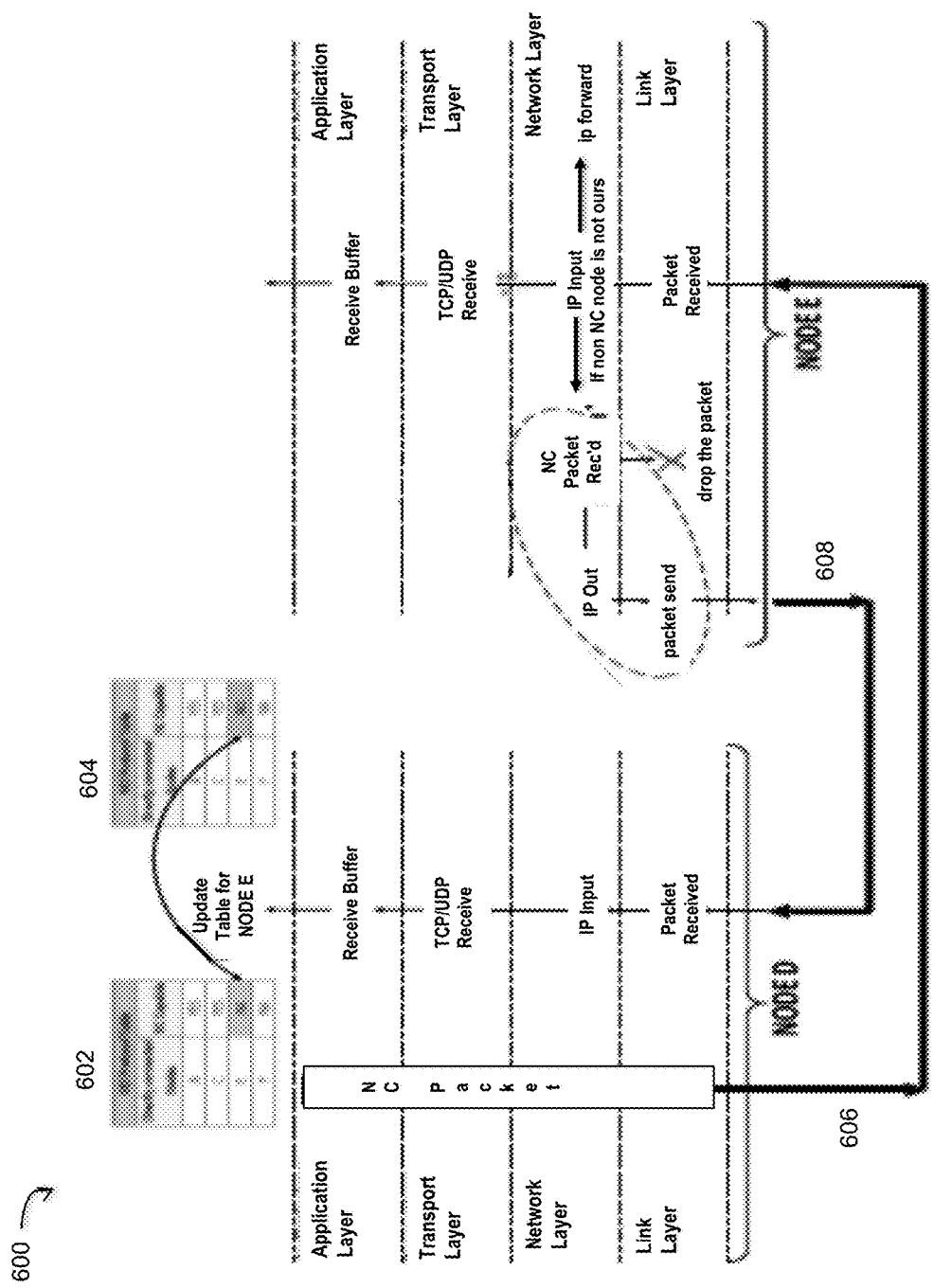
FIG. 6 illustrates an update process for an example NCI table, under some embodiments.

FIG. 6 is a diagram that illustrates a process of updating an NCI table for a previously unknown non-NC node, under some embodiments. Diagram 600 illustrates components and functions within the application, transport, network, and link layers of a receiving node (Node D) and a receiving node (Node E) during the attempted transmission of an encoded NC packet through a non-NC Node E. As shown in FIG. 6, the NC encoded packet 606 is transmitted from Node D to Node E, where it is received in the link layer. The network layer of Node E then determines that it cannot recognize the NC encoded packet as a valid packet under the standard IP protocol and drops the packet. Node E then sends an intimation message 608 back to Node D as an ICMP or PPP protocol packet from the network layer. This intimation packet is received in the link layer of Node D and processed through the other layers of Node E to ultimately reach Node E's receive buffer. This packet message is then used to update the Node E entry in the NCI table of Node D. For the example shown, the Node E entry is updated from an initial state 602 of NA for Node E to state 604 that shows NO for Node E. Future NC encoded packets from Node D to Node E will then be decoded first in Node D (as shown in FIG. 5) prior to transmission to Node E so that NC packets will not be dropped in Node E.

Thus, as shown in FIG. 6, if an NC encoded packet is received at a non-NC capable node (Node E), it will first drop the packet, but it will also send a pre-defined intimation packet to the sender (Node D) informing that it could not understand the packet. As soon as sender (Node D) receives this pre-defined packet, it will update its NCI Table entry for Node E from "NA" to "NO". If the sender does not receive any such intimation within a pre-defined time, this will be an indication that Node E is an NC node, in which case it will update the entry for Node E from "NA" to "YES".

The example embodiment of FIG. 6 is intended to be an example of a possible network layer structure for the nodes of FIG. 2, and many other structures are also possible. For the case where the IP layer is used for the intimation packet, any of the reserved field of the IP Layer can be used to generate the intimation packet.

In summary, the NCI protocol works in heterogeneous networks having both NC and non-NC nodes by implementing a process whereby a non-NC node, upon receiving the first NC encoded packet will return an error in acknowledgement to the source NC node. The source NC node will have a table of neighbor nodes information that indicates whether or not NC is supported. The source NC node always decodes the packet for any non-NC destination nodes and sends the encoded packet to NC nodes as per the table. Whenever a new non-NC node is introduced to the network, the source NC node will send an encoded packet and based on an acknowledgement, the table entry for that node updated. If NC is supported then the source sends the encoded packet, otherwise it sends the decoded packet.

Embodiments of the NC aware mechanisms using the NCI protocol described herein can boost the network bandwidth for heterogeneous (NC and non-NC nodes) networks. These mechanisms can increase the performance of packet handling for switch and router manufacturers. As network coding is increasing used in greater applications, support of NC and Non-NC interoperability will greatly help keep all nodes alive in the network. The NCI protocol will help in increasing the throughput and can be used in buffering and packeting.

The network server computers and client computers shown in FIGS. 1 and 2 are coupled together over a network that may be a LAN, WAN or other appropriate network. The network provides connectivity to the various systems, components, and resources of the system, and may be implemented using protocols such as Transmission Control Protocol (TCP) and/or Internet Protocol (IP) as in hypertext transport protocols (HTTP), well known in the relevant arts. For network coding environments, the network may comprise ad hoc networks, multicast switches, wireless networks, p2p (peer-to-peer) messaging, SDN networks, and Internet of Things (IoT) application networks, among other appropriate networks.

Figure 7:
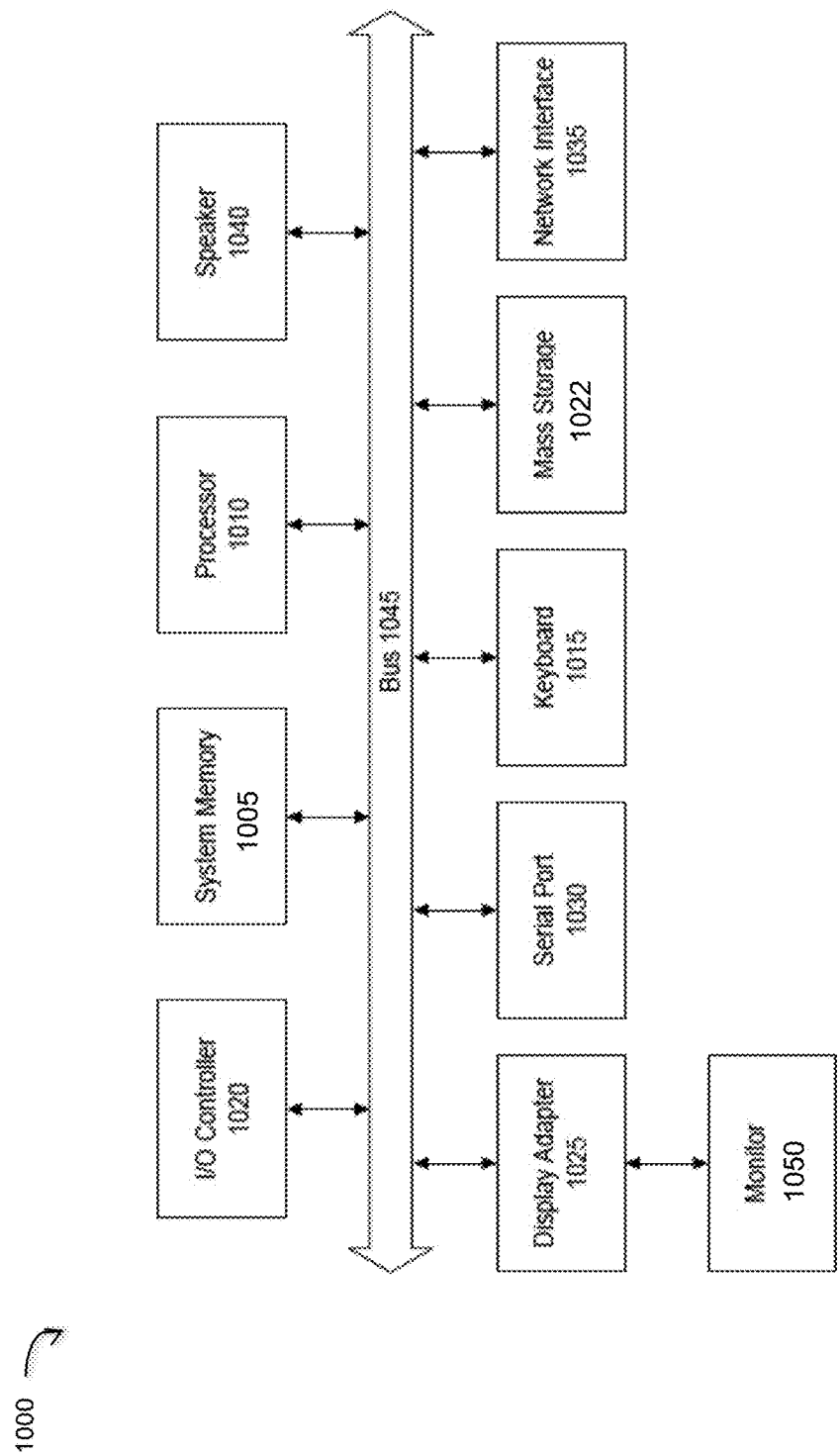
FIG. 7 shows a system block diagram of a computer system used to execute one or more software components of the at least the system of FIGS. 1 and 2, and the method of FIG. 4, under some embodiments.

The network environment of FIGS. 1 and 2 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for transmitting network coding (NC) and non-NC data in a heterogenous computer network having both NC nodes and non-NC nodes, the method comprising:
    transmitting data packets for both the NC and non-NC data from a source node to a destination node through one or more intermediate nodes;
    maintaining, in each node of the network, a network coding interoperability (NCI) table indicating an NC status of each direct neighbor of the node;
    forming a protocol grouping for each direct neighbor link between an NC node and a non-NC node;
    transmitting NC data directly from an upstream NC node to a direct neighbor downstream NC node;
    transmitting non-NC data directly from an upstream NC node to a direct neighbor downstream non-NC node; and
    decoding, using the protocol grouping, NC data bound for a non-NC node in a direct upstream NC node prior to transmission to the non-NC node.

2. The method of claim 1 wherein the NC status comprises one of: NC capable, non-NC capable, and NC status not known (NA).

3. The method of claim 2 wherein the NCI table is populated in an initial state to all direct neighbors having an NA status.

4. The method of claim 3 wherein the initial state of the NCI table is updated dynamically during runtime of the network to reflect a current status of each direct neighbor.

5. The method of claim 1 wherein the current status of each direct neighbor is updated through at least one of: a predefined message transmitted from the destination node to the source node upon attempted transmission of an NC data packet from the source node to the destination node, or upon indication that the NC data packet was dropped or not dropped at the destination node after transmission from the source node.

6. The method of claim 4 wherein the NCI table comprises a lookup table maintained in a memory of the source node.

7. The method of claim 4 further comprising:
    transmitting NC data directly from the upstream NC node to a direct neighbor downstream NA node;
    waiting for one of an acknowledgment or intimation signal that the direct neighbor downstream NA node dropped the NC data;
    decoding the NC data bound for the NA node in the direct upstream NC node prior to transmission to the NA node; and
    updating the direct upstream node's table to reflect that a status of the NA node to non-NC capable from NA status.

8. The method of claim 7 further comprising transmitting future packets from the source node to the destination node in accordance with the updated table.

9. The method of claim 7 wherein the indication comprises at least one of: an intimation packet transmitted from the destination node to the source node, or a lack of acknowledgement of a received packet at the destination node from the direct upstream NC node based on a defined timeout period.

10. The method of claim 9 wherein the intimation packet is embodied as a reserved field of the Internet Protocol (IP) layer of the destination and source nodes.

11. The method of claim 1 wherein the network comprises at least one of: and ad hoc network, a network of multicast switches, a wireless mesh network, a peer-to-peer messaging network, and an Internet of Things (IoT) application network.

12. A system transmitting network coding (NC) and non-NC data in a heterogenous co cuter network having both NC nodes and non-NC nodes, comprising:
 a source node of the network transmitting data packets for both the NC and non-NC data to a destination node through one or more intermediate nodes;
 a network coding interoperability (NCI) table maintained in each node of the network and indicating an NC status of each direct neighbor of the respective node;
 a server component forming a protocol grouping for each direct neighbor link between an NC node and a non-NC node;
 a transmitter transmitting NC data directly from an upstream NC node to a direct neighbor downstream NC node, and transmitting non-NC data directly from an upstream NC node to a direct neighbor downstream non-NC node; and
 a decoder using the protocol grouping to decode NC data bound for a non-NC node in a direct upstream NC node prior to transmission to the non-NC node.

13. The system of claim 12 wherein the NC status comprises one of: NC capable, non-NC capable, and NC status not known (NA), and wherein the NCI table is populated in an initial state to all direct neighbors having an (NA) status.

14. The system of claim 13 wherein the initial state of the NCI table is updated dynamically during runtime of the network to reflect a current status of each direct neighbor, and wherein the current status of each direct neighbor is updated through at least one of: a predefined message transmitted from the destination node to the source node upon attempted transmission of an NC data packet from the source node to the destination node, or upon indication that the NC data packet was dropped or not dropped at the destination node after transmission from the source node.

15. The system of claim 14 wherein the NCI table comprises a lookup table maintained in a memory of the source node.

16. The system of claim 13 further comprising:
 the transmitter transmitting NC data directly from the upstream NC node to a direct neighbor downstream NA node, and waiting for one of an acknowledgment or intimation signal that the direct neighbor downstream NA node dropped the NC data;
 the decoder decoding the NC data bound for the NA node in the direct upstream NC node prior to transmission to the NA node, and updating the direct upstream node's table to reflect that a status of the NA node to non-NC capable from NA status.

17. The system of claim 16 wherein the indication comprises at least one of: an intimation packet transmitted from the destination node to the source node, or a lack of acknowledgement of a received packet at the destination node from the direct upstream NC node based on a defined timeout period.

18. The system of claim 12 wherein the network comprises at least one of: and ad hoc network, a network of multicast switches, a wireless mesh network, a peer-to-peer messaging network, and an Internet of Things (IoT) application network.

19. A computer program product, comprising a non-transitory computer-readable medium having a computer-readable program code embodied therein, the computer-readable program code adapted to be executed by one or more processors to transmit network coding (NC) and non-NC data in a heterogeneous computer network having both NC nodes and non-NC nodes, by executing instructions implementing a method comprising:
 transmitting data packets for both the NC and non-NC data from a source node to a destination node through one or more intermediate nodes;
 maintaining, in each node of the network, a network coding interoperability (NCI) table indicating an NC status of each direct neighbor of the respective node;
 forming a protocol grouping for each direct neighbor link between an NC node and a non-NC node;
 transmitting NC data directly from an upstream NC node to a direct neighbor downstream NC node;
 transmitting non-NC data directly from an upstream NC node to a direct neighbor downstream non-NC node; and
 decoding, using the protocol grouping, NC data bound for a non-NC node in a direct upstream NC node prior to transmission to the non-NC node.

20. The computer program product of claim 19 wherein the method further comprises:
 transmitting NC data directly from the upstream NC node to a direct neighbor downstream NA node;
 waiting for one of an acknowledgment or intimation signal that the direct neighbor downstream NA node dropped the NC data;
 decoding the NC data bound for the NA node in the direct upstream NC node prior to transmission to the NA node;
 and
updating the direct upstream node's table to reflect that a status of the NA node to non-NC capable from NA status; and
 transmitting future packets from the source node to the destination node in accordance with the updated table, and wherein the indication comprises at least one of: an intimation packet transmitted from the destination node to the source node, or a lack of acknowledgement of a received packet at the destination node from the direct upstream NC node based on a defined timeout period.

* * * * *